United States Patent [19]

Burghardt

[11] Patent Number: 4,625,504
[45] Date of Patent: Dec. 2, 1986

[54] PITCHED CABLES SHEATHED WITH A PLASTIC FILM AND METHOD OF SHEATHING

[75] Inventor: Franz Burghardt, Asslar, Fed. Rep. of Germany

[73] Assignee: Küster & Co. GmbH, Ehringshausen, Fed. Rep. of Germany

[21] Appl. No.: 748,319

[22] Filed: Jun. 24, 1985

[30] Foreign Application Priority Data

Nov. 22, 1984 [DE] Fed. Rep. of Germany ....... 3442494

[51] Int. Cl.$^4$ .............................................. D07B 1/16
[52] U.S. Cl. ........................................ 57/223; 57/3; 57/7; 57/210
[58] Field of Search .................... 57/3, 6, 7, 9, 200, 57/138, 210, 212, 217, 221, 223, 295, 309, 311, 906, 232, 258; 296/223

[56] References Cited

U.S. PATENT DOCUMENTS

| | | | |
|---|---|---|---|
| 1,983,962 | 12/1934 | Barber et al. | 57/213 X |
| 2,351,589 | 6/1944 | Abbott | 57/7 |
| 2,840,882 | 7/1958 | Smith | 57/225 X |
| 2,865,978 | 12/1958 | Modrey | 57/225 X |
| 3,083,817 | 4/1963 | Campbell | 57/311 |
| 3,745,756 | 7/1973 | Crandall | 57/7 X |
| 4,453,922 | 6/1984 | Glaser | 296/223 X |

OTHER PUBLICATIONS

FELSS, "Hämmern Statt Spanen . . . Spanlos ist Rationeller", pp. 1–7.

*Primary Examiner*—Donald Watkins
*Attorney, Agent, or Firm*—Wells & Wells

[57] ABSTRACT

A pitched cable is sheathed over a defined length with a plastic polyamide film. The method includes the steps of slipping a plastic polyamide tube over a pitched cable and affixing this tube to the cable by hammering. An additional procedural step is also described, namely the prior reduction of the outside diameter of the pitched cable, so that with appropriate dimensions of the plastic tube, it is possible to make a plastic sheathing for the pitched cable, with the outside diameter of the plastic tube then being only trivially larger than the outside diameter of the unsheathed cable length.

5 Claims, 1 Drawing Figure

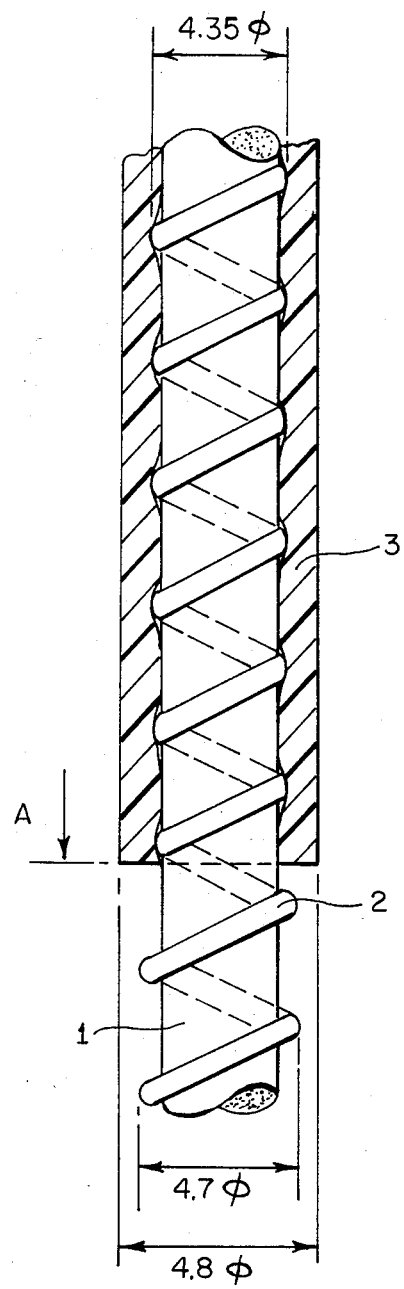

PITCHED CABLES SHEATHED WITH A PLASTIC FILM AND METHOD OF SHEATHING

BACKGROUND OF THE INVENTION

The invention relates to a pitched cable sheathed with a plastic film over a defined length.

The term "pitched cable" here and below designates a wire or a stranded assembly of wires around which is wound a single wire at a constant pitch, where the single wire is called the pitch helix. When seen in longitudinal and axial section, such cables assume the shape of a gear rack and therefore mesh with pinions of the same pitch and upon their longitudinal displacement rotate a pinion or vice-versa are displaced themselves upon pinion rotation.

Compared to rigid gear racks, pitched cables offer the advantage of flexibility while nevertheless are capable of transmitting mechanical tensional and compressive forces. Therefore, the pitched cables are laid in arcs once minimum radii have been observed. However, being flexible, the exploitation of their gear-rack effect requires guiding them in a tube which is cut open at the site of the pinion engagement.

Typically, however, only a limited section of a pitched cable is used in its gear-rack function and the remainder of the cable merely serves for force transmission in the longitudinal cable direction which, as already stated, is laid in arcuate manner. Such an application, for instance, is in the drive mechanism of automobile sunroofs, as disclosed in U.S. Pat. Nos. 2,985,483; 3,572,822; 3,863,979; 3,976,325; 4,081,926; and 4,469,371, the disclosures of which are incorporated herein by reference.

As a rule two lengths of pitched cables are used in a sunroof, which engage a pinion on its opposite sides on the front cross-side of the roof opening. When the pinion rotates, for instance by means of a handcrank, the two lengths of pitched cable are longitudinally displaced toward opposite sides and thereby displace the sunroof connected in suitable mechanical manner to the free ends of the two cables.

The two cables are guided within a tube, but it is easily seen that only a short length of the cable is used as a quasi gear-rack, with the remaining length of cable merely transmitting the force to the sunroof. This length also is laid in an arc around the corner.

It has long been known to be a drawback that the cable lengths which do not mesh with the pinion and, therefore, are not held or supported by it tend to knock in their guide tubes and, therefore, produce bothersome noises. It has long been desirable to tighten the cables within the guide tubes in order to eliminate this knocking. To date this problem has not been satisfactorily solved. For instance, an attempt has already been undertaken to cover the cable length not needed as a gear rack with plastic flocks of fibers. However this was found to be entirely unsuitable due to the softness of the fibers which are relatively quickly abraded during cable displacement at those sites of highest stress.

Again an attempt has been made to pull a shrinkable tube over the pitched cable, that is a plastic tube which shrinks upon subsequent heating and thereby tightly fits on the cable. However, the material suitable for shrinking also is found to be too soft and wears very rapidly in use.

SUMMARY OF THE INVENTION

It is, therefore, an object of the present invention to provide a method whereby a pitched cable is provided with a solid plastic coating over a desired and relatively short length.

This object is achieved by a method for sheathing a pitched cable with a plastic film comprising: slipping a plastic tube (3) over the length to be sheathed of the pitched cable (1), and this plastic tube is affixed by an external force to the pitched cable so that while its outside diameter is decreased at least part of the inside wall of the plastic tube enters the space between the turns of the pitch helix (2).

These steps consist first in pulling a plastic tube of low wall thickness over the pitched cable and second affixing this plastic tube onto the pitched cable by an externally applied force. This fixing is carried out by driving part of the plastic tube into the quasi threads of the pitch helix. The external force suitably is hammering. In practice this means that the pitched cable with the plastic tube drawn over it is moved through one of the known pounding machines for the length of the plastic tube.

Such pounding machines are manufactured by Gebr. FELLS MASCHINENFABRIK, D-7535 Koenigsbach-Stein 2, West Germany, and are shown in their brochure "haemmern statt spanen . . . spanlos ist rationeller". Model number HE 15-V is particularly suitable for use in the present invention.

However other externally applied forces also are conceivable, for instance rolling. The type of applied force is without significance for the invention. Any suitable applied force is adequate.

The method of the invention offers the advantage of using a tube made of a plastic harder than that used earlier when affixing flocks or when using shrinkable tubing. These harder types of plastics easily withstand the mechanical stresses incurred during cable displacement and its ensuing friction against the inside wall of the guide tube, even when in arcuate form. These plastics are extensively abrasion-resistant. Samples used in testing already have withstood undamaged operational cycles which in their numbers well exceed the number of cycles demanded by automobile manufacturers.

Extruded polyamide tubing is particularly suitable as disclosed in the Kirk-Othmer "Encyclopedia of Chemical Technology", 2nd Ed., Vol. 16 (1968), under the section "Polyamide (Plastics)", pages 88–105, particularly page 92, polylauryllactam (nylon-12) and polyundecanamide (nylon-11) and page 99, extrusion of tubing and pipe.

In a further embodiment of the present invention, an additional procedural step may be added to the method, namely to initially hammer down the outside diameter of the cable length, to be sheathed and then to pound the plastic tube into place. This additional procedural step is desirable where the outside diameter of the plastic sheath may not significantly exceed the outside diameter of the pitched cable.

BRIEF DESCRIPTION OF THE DRAWING

The drawing shows a longitudinal section of an illustrative embodiment of the pitched cable, and indicates the particular diameters.

DESCRIPTION OF THE PREFERRED EMBODIMENT

The pitched cable used in the present invention is stranded from 19 wires, i.e.: 1 core wire having a diameter of 0.8 mm; a first layer of nine wires having a wire diameter of 0.37 mm; and a second layer of nine wires having a wire diameter of 0.65 mm.

The cable is stranded in Seal-construction and the wire wound helically on the outer layer is a steel wire of 1.15 mm diameter. The pitch is 2.54 mm.

Together with its pitch helix (2), the pitched cable (1) has an outside diameter of 4.7 mm which first is hammered down to 4.35 mm on the cable length which is to be sheathed. The plastic polyamide tube (3) initially has an outside diameter of 5.5 mm and an inside diameter of 4.5 mm. With these dimensions, the tube (3) is moved over the pounded cable length→A and then has its own diameter hammered down. In the final state the plastic sheath then has an outside diameter of 4.8 mm. During this procedure, part of the inside wall of the plastic tube has entered the gap between the turns of the pitch helix and thereby firmly fixes the plastic sheath onto the cable. The sheathed length of cable therefore has an outside diameter only trivially exceeding the free length of cable, the excess being that much larger the more play must be compensated in the guide tube, while nevertheless easily sliding through this guide tube.

What is claimed is:

1. A pitched cable partially sheathed with a plastic film and having an unsheathed portion defining a gear rack, comprising a plastic polyamide tube slipped over a given length of a pitched cable having a pitch helix and gaps between turns of said pitch helix, said plastic tube affixed to said pitched cable so that the outside diameter of said tube is decreased and parts of the inside wall of said plastic tube are entered into said gaps between said turns of said pitch helix and thereby said tube is firmly fixed onto said cable.

2. The sheathed pitched cable of claim 1, wherein said pitch helix of said pitched cable is reduced in its outside diameter by an external force prior to the plastic tube being slipped on it.

3. A method for partially sheathing a pitched cable with a plastic film where the unsheathed portion defines a gear rack, comprising: slipping a plastic polyamide tube over a given length to be sheathed of a pitched cable having a pitch helix and gaps between turns of said pitch helix, affixing said plastic tube by hammering to said pitched cable so that the outside diameter of said tube is decreased and parts of the inside wall of said plastic tube are entered into said gaps between said turns of said pitch helix and thereby said tube is firmly fixed onto said cable.

4. The method of claim 3, wherein said pitch helix of said pitched cable is reduced in its outside diameter by a second external force prior to said plastic tube being slipped on it.

5. The method of claim 4, wherein said second externally applied force is hammering.

* * * * *